(12) United States Patent
Naspolini et al.

(10) Patent No.: US 11,487,264 B2
(45) Date of Patent: Nov. 1, 2022

(54) SENSOR AND ACTUATOR BASED LIFECYCLE MONITORING OF MACHINES PERFORMING AUTOMATED MACHINE TASKS

(71) Applicant: ARVUS TECNOLOGIA LTDA., Florianópolis (BR)

(72) Inventors: Adriano Correa Naspolini, Florianópolis (BR); Bernardo Francisco Duarte De Castro, Florianópolis (BR); Carolina Parreira Lorini, Florianópolis (BR); Geovany Voi Filho, Florianópolis (BR)

(73) Assignee: ARVUS TECNOLOGIA LTDA., Florianópolis (BR)

( * ) Notice: Subject to any disclaimer, the term of this patent is extended or adjusted under 35 U.S.C. 154(b) by 1119 days.

(21) Appl. No.: 16/101,204

(22) Filed: Aug. 10, 2018

(65) Prior Publication Data
US 2020/0050162 A1 Feb. 13, 2020

(51) Int. Cl.
*G06F 17/00* (2019.01)
*G05B 19/042* (2006.01)
(Continued)

(52) U.S. Cl.
CPC ........... *G05B 19/0426* (2013.01); *G07C 3/08* (2013.01); *A01B 76/00* (2013.01); *B66C 13/16* (2013.01);
(Continued)

(58) Field of Classification Search
CPC ...... G05B 19/0426; G05B 2219/23008; G05B 23/024; G07C 3/08; A01B 76/00;
(Continued)

(56) References Cited

U.S. PATENT DOCUMENTS 6,810,405 B1 * 10/2004 LaRue .................. A61M 19/00
707/621
7,859,431 B2 * 12/2010 Peddie ............. G08G 1/096783
340/907

(Continued)

FOREIGN PATENT DOCUMENTS

WO WO-2009094413 A2 * 7/2009 ............. G07C 5/008

*Primary Examiner* — Ronnie M Mancho
(74) *Attorney, Agent, or Firm* — Maschoff Brennan

(57) ABSTRACT

The invention relates to a control system for automatically monitoring machine tasks and workflows performed by agriculture, mining or construction machines, comprising a computer for enabling a user to configure sensors and actuators and for reading sensor and actuator signals as sensor values and actuator statuses, a hardware interface for connecting the computer to an installed sensor and actuator network having a plurality of sensors and actuators, and a software configuration tool with a software interface, wherein the software interface enables a user to enter configuration instructions for instructing the computer, to configure a user-specifically customizable transformed sensor based on amending a sensor value and/or actuator status of a sensor and/or actuator of the sensor and actuator network and machine task based on logically linking sensor values, transformed sensor values and actuator statuses, wherein the user-specific customizability is enabled by providing a selectability, linkability and conditionability of sensor values, transformed sensor values and actuator statuses as variables, wherein at least two variables are logically linked and wherein at least one variable is conditioned based on using relational operators.

16 Claims, 3 Drawing Sheets

(51) Int. Cl.
*G07C 3/08* (2006.01)
*B66C 13/48* (2006.01)
*E21C 35/24* (2006.01)
*A01B 76/00* (2006.01)
*E02F 9/20* (2006.01)
*E02F 9/26* (2006.01)
*E21C 35/04* (2006.01)
*B66C 13/16* (2006.01)

(52) U.S. Cl.
CPC ............... *B66C 13/48* (2013.01); *E02F 9/20* (2013.01); *E02F 9/26* (2013.01); *E21C 35/04* (2013.01); *E21C 35/24* (2013.01); *G05B 2219/23008* (2013.01)

(58) Field of Classification Search
CPC .. B66C 13/16; B66C 13/48; E02F 9/20; E02F 9/26; E02F 9/264; E02F 9/267; E21C 35/04; E21C 35/24
USPC .......................................................... 701/50
See application file for complete search history.

(56) References Cited

U.S. PATENT DOCUMENTS

| | | | | |
|---|---|---|---|---|
| 8,463,946 B2* | 6/2013 | Ferguson | ................. | G07C 3/00 455/552.1 |
| 8,627,306 B2* | 1/2014 | Meiss | ..................... | G06F 8/65 717/121 |
| 8,949,054 B2* | 2/2015 | Bjorn | ..................... | G01R 31/52 702/65 |
| 9,619,146 B2* | 4/2017 | Fujimori | .............. | G07C 5/0808 |
| 9,690,594 B2* | 6/2017 | Brindle | ................. | G06F 9/4401 |
| 9,815,477 B2* | 11/2017 | Yu | ........................ | B60W 40/08 |
| 2003/0114966 A1* | 6/2003 | Ferguson | ............ | G06F 11/2294 701/31.4 |
| 2005/0004735 A1* | 1/2005 | Kelly | .................... | H04L 69/329 701/50 |
| 2007/0142940 A1* | 6/2007 | Ferguson | ............ | G05B 23/0216 700/83 |
| 2007/0142990 A1* | 6/2007 | Moughler | .............. | H04L 12/14 701/50 |
| 2007/0143585 A1* | 6/2007 | Ring | ........................ | E02F 9/26 713/1 |
| 2007/0253342 A1* | 11/2007 | Bierdeman | ......... | H04L 12/2807 370/254 |
| 2009/0150504 A1* | 6/2009 | Graham | .............. | H04L 12/4641 709/206 |
| 2010/0037215 A1* | 2/2010 | Meiss | ....................... | G06F 8/65 717/168 |
| 2010/0290348 A1* | 11/2010 | Stanislaus | ............. | H04L 41/082 714/E11.073 |
| 2012/0173682 A1* | 7/2012 | Mantere | .............. | G06F 9/44505 709/221 |
| 2014/0208306 A1* | 7/2014 | Halder | ...................... | G06F 8/65 717/172 |
| 2014/0325194 A1* | 10/2014 | Brindle | ................. | G06F 9/4401 713/1 |
| 2017/0240181 A1* | 8/2017 | Yu | .......................... | B60R 25/00 |
| 2021/0089008 A1* | 3/2021 | Xu | ..................... | G05B 19/4083 |

* cited by examiner

SENSOR AND ACTUATOR BASED LIFECYCLE MONITORING OF MACHINES PERFORMING AUTOMATED MACHINE TASKS

FIELD OF THE INVENTION

This invention relates generally to the field of lifecycle monitoring of machines performing automated machine tasks in agriculture, mining or construction and specifically to a control system for customizing and automating a machine's monitoring functionality based on a machine's sensor and actuator network.

BACKGROUND TO THE INVENTION

In the field of precision agriculture, mining or construction different kind of machines perform increasingly complex tasks fully automatically. Therefore, the corresponding machine is equipped with a plurality of sensors and actuators. Based on their factory defined association related machine tasks and workflows can be identified at least partly by a corresponding factory installed control system still necessitating user-input to e.g. tell or confirm to the controller that a corresponding machine task is being executed. Data related to the identified machine tasks and workflows can be collected and used for analyzing a machine's operating hours. The quality or reliability of the collected data strongly depends on correct and regular user-input.

OBJECT OF THE INVENTION

There is a desire to user-specifically customize, monitor, automate and optimize agricultural, mining or construction related machine processes to become more efficient and more resource-saving.

A possible way to track the efficiency of such a machine is to monitor the different machine tasks and workflows the machine performs during a lifecycle and analyze collected data with respect to productive time and non-productive time.

It is therefore object of the invention to provide a more flexible and more reliable monitoring functionality for agricultural, mining or construction machines performing a great variety of machine tasks and workflows in order to provide more reliable data based on which the efficiency of a machine can be analyzed.

SUMMARY OF THE INVENTION

The invention relates to a control system for automatically monitoring machine tasks and workflows performed by agriculture, mining or construction machines, comprising a computer for enabling a user to configure sensors and actuators and for reading sensor and actuator signals as sensor values and actuator statuses, a hardware interface for connecting the computer to an installed sensor and actuator network having a plurality of sensors and actuators, and a software configuration tool with a software interface, wherein the software interface enables a user to enter configuration instructions for instructing the computer, to configure a user-specifically customizable transformed sensor based on amending a sensor value and/or actuator status of a sensor and/or actuator of the sensor and actuator network and machine task based on logically linking sensor values, transformed sensor values and actuator statuses, wherein the user-specific customizability is enabled by providing a selectability, linkability and conditionability of sensor values, transformed sensor values and actuator statuses as variables, wherein at least two variables are logically linked and wherein at least one variable is conditioned based on using relational operators.

The installed sensor and actuator network can be amendable by e.g. adding, removing or replacing sensors and actuators. Thereby the sensor and actuator network can comprise e.g. factory installed sensors and actuators and aftermarket sensors and actuators simultaneously.

Thereby the sensors and actuators of the sensor and actuator network can comprise one of pressure sensor, acceleration sensor, velocity sensor, distance sensor, angular sensor, GNSS sensor, flow sensor, temperature sensor, humidity sensor, pyroelectric sensor, ultrasonic sensor, infrared sensor, any mechanical, thermo-electrical, resistive, piezoelectric, capacitive, inductive, optical, magnetic, digital or analogue sensor. Further, an actuator is a mover which controls a mechanism by performing an actuator action. An actuator can be one of a hydraulic, a pneumatic, an electric, a thermal, a magnetic and a mechanical actuator.

Sensors and actuators regardless of whether they are pre-installed or not, provide raw data referred to as sensor and actuator signals accordingly. The sensor and actuator raw data can either be used directly or be converted to a sensor value or actuator status accordingly. Conversion is based on performing a mathematical operation e.g. a filtering operation on the signal. If the corresponding raw data is used the sensor value equals the sensor signal and the actuator status equals the actuator signal.

The hardware interface for connecting the computer to the installed sensor and actuator network can be configured for enabling a user to connect additional sensors and actuators to the installed sensor and actuator network, to remove sensors and actuators from the installed sensor and actuator network and to replace sensors and actuators of the installed sensor and actuator network.

According to an embodiment of the invention a sensor value and/or actuator status of a sensor and/or actuator of the sensor and actuator network can be amended based on a mathematical operation involving corresponding operators and operands.

The mathematical operation can be performable on the sensor and/or actuator signal, meaning directly on the raw data provided by the sensor and/or actuator or on the sensor value and/or actuator status. In either case the operation can involve the sensor and/or actuator signal or the sensor value and/or actuator status as an operand. Typical mathematical operations involve the combination of signals, values and statuses with a constant factor by addition, subtraction, multiplication, division or a combination thereof. But also the calculation of an average signal, average value, average status or a time integral of a signal, value, status can be a mathematical operation.

According to an embodiment of the invention, logically linking at least two variables can be based on using at least one of the Boolean operators.

The Boolean operators are logical linkers and comprise at least the operators AND and OR. Within the context of linking variables together at least one of the variables is conditioned. This means that depending on the machine task which is to be defined a corresponding sensor/transformed sensor value and/or a corresponding actuator status needs to satisfy a machine task related condition. Such a condition can e.g. be a value range in case of sensors/transformed sensors or a specific status out of possible statuses of an actuator.

According to an embodiment of the invention the software interface can further enable a user to enter configuration instructions for instructing the computer, to configure a user-specifically customizable workflow based on a chronological sequence of machine tasks.

Chronological sequences of machine tasks can be used in order to make a corresponding machine task unambiguously identifiable e.g. in a case where two different machine tasks are equally configured they can be unambiguously identified based on preceding and/or subsequent machine tasks.

According to a specific embodiment of the invention the software interface is implemented as web-interface.

The software configuration tool provides a software interface which can be used by a user in order to enter configuration instructions interpretable by the computer. The interface can be based on providing a mask with input fields for entering alphanumerical information and/or with lists providing selectable input options. The software is able to translate the input into computer interpretable code. Thereby the interface can be realized such that a user does not need to have knowledge on how to write computer interpretable code. The software interface can be accessed e.g. directly if the computer has an according display functionality and input means or remotely, whereby the software interface is implemented as web-interface. In case of the software interface being realized as web-interface the computer comprises further necessary components for establishing a related wireless data transfer connection e.g. a wireless internet connection.

According to an embodiment of the invention a plurality of sensors and actuators of the installed sensor and actuator network can provide related signals based on the controller area network bus (CAN-bus) standard.

As a plurality of machines being manufactured have a huge variety of sensors and actuators providing their related signals based on the CAN-bus standard the hardware interface can enable a connectibility of the computer and the installed sensor and actuator network based on the CAN-bus standard. Nevertheless, the hardware interface can enable a connectibility to e.g. aftermarket sensors and/or actuators not being based on the CAN-bus standard. Thereby the installed sensor and actuator network can be freely amended at any point in time not relying solely on a connectibility based on the CAN-bus standard.

According to a specific embodiment of the invention the computer can have a display functionality realized as touchscreen enabling a user to enter configuration instructions by means of the software interface.

The computer can be designed as a mobile e.g. handheld device having a robust housing, e.g. shock-resistant and waterproof, and having a touchscreen. The display functionality of the touchscreen can display the software configuration tool's interface and the touch functionality of the touchscreen provides the input means for enabling a user to input data into the software interface.

According to an embodiment of the invention the control system may further comprise a data storage, wherein, the computer is configured for sending data to and retrieving data from the data storage.

The data storage can be an integral part of the computer or designed as a cloud based data storage being accessible by the computer by means of a wireless data transfer connection, e.g. a wireless internet connection. The data storage can serve the purpose of storing data related to the monitoring of machine tasks and/or workflows. Such data may comprise e.g. configuration data of transformed sensors, machine tasks and of workflows. Further, such data may comprise as well time related machine task and/or workflow data. Time related machine task and/or workflow data may comprise information on the exact time when a corresponding machine task and/or workflow is started, on the time duration during which a corresponding machine task and/or workflow is executed and on the exact time when a corresponding machine task and/or workflow is terminated. In order to generate such time related data the computer may be configured for automatically identifying according configured machine tasks and/or workflows based on read sensor values, transformed sensor values and actuator statuses or based on read sensor and actuator signals. Data stored in the data storage can be used for analyzing tasks and workflows performed by a machine over a machine's lifecycle. Based on this data it can be possible to draw conclusions on a machine's efficiency.

Therefore, according to an embodiment of the invention the computer can be configured for automatically identifying a configured machine task and/or workflow during operation of a machine, being equipped with such a control system, based on read sensor values, transformed sensor values and actuator statuses, and for sending time related machine task and/or workflow data to the data storage for data collection.

According to an embodiment of the invention the computer may have a machine learning module with a machine learning functionality, wherein, based on the collected data stored in the data storage the machine learning module within the machine learning functionality automatically identifies machine tasks and workflows depending on read sensor signals, transformed sensor signals and actuator statuses and wherein the computer may be configured for sending time related data of as-identified machine tasks and workflows to the data storage.

The machine learning module with its machine learning functionality uses the collected sensor, actuator, machine task, workflow and corresponding time related data as sample database comprising a large variety of sensor signal, sensor value, transformed sensor value, actuator signal and actuator status combinations corresponding to a large variety of samples of machine tasks and/or workflows. Based on this large variety of samples the machine learning functionality automatically identifies new machine tasks or workflows which are not yet configured depending on read sensor signals, values and actuator statuses during operation of a machine. Within the machine learning functionality, the computer is configured for sending according time related data to the data storage. As-stored data as well can be used for analyzing tasks and workflows performed by a machine over a machine's lifecycle. Based on this data it can be possible to draw conclusions on a machine's efficiency.

According to an embodiment of the invention the computer may further be configured for assigning a machine operator identification (OID) to the data being sent to the data storage.

If an operator is operating a machine which is equipped with a control system according to the invention, situations might occur where user-input is required in order to keep the automatic monitoring functionality running. Therefore, it can be useful to assign a corresponding operator identification (OID) to according data being sent to the data storage. Further the OID information could be used to analyze the stored data with respect to operator dependent efficiency and therefore for training purposes.

According to an embodiment of the invention the computer may have a geospatial sensor which is includable into the sensor and actuator network and provides information on a machine's position on earth, speed, heading and on date and time.

The computer might be equipped with further sensors or actuators integrated in the housing or attached to it. Such sensors or actuators are integrated and part of the sensor and actuator network and are usable within the functionality of the software tool.

According to an embodiment of the invention the software interface may enable a user to distribute corresponding configuration instructions to a plurality of computers being part of a plurality of control systems.

In case a fleet owner operates a plurality of different machines which are equipped with a control system according to the invention the computers of the control systems might be wirelessly connected, such that for a fleet owner it is possible to enter configuration instructions by means of one software interface and distribute the configuration instructions to any computer of the control systems.

According to a further embodiment of the invention the software interface may enable a user to enter configuration instructions for instructing the computer, to configure a user-specifically customizable action being executed by the computer and being triggered based on at least one of: a read sensor value, a read transformed sensor value, and a read actuator status.

An action can be a software routine that is triggered by a user-specifically customizable condition, wherein the condition can be based on a read sensor value, a read transformed sensor value, or a read actuator status or any combination thereof. Further, the rule can be based on an automatically identified machine task or workflow, e.g. such that entering a machine task or exiting a machine task can trigger the action. Possible actions can be e.g. logging out, checking for updates, updating, looking for paired vehicles.

According to an embodiment of the invention, the control system may be configured as functional but not as physical unit, wherein the software configuration tool is remotely integrated in the control system.

The control system can be designed such that the software configuration tool is not comprised by the computer and the computer is configured to receive and implement related configuration instructions. E.g. the software configuration tool can be installed and executed on a different computer e.g. on an office desktop computer. A user enters corresponding configuration instructions on said different computer and entered configuration instructions are then distributed to the computer of a control system by means of a wireless data transfer connection e.g. an internet connection.

Further, the invention relates to a computer program product comprising computer code on a machine readable medium, which when executed by a computer is instructing a computer to provide a software configuration tool within a control system according to the invention, which software configuration tool has a software interface, wherein the software interface enables a user to enter configuration instructions for instructing the computer, to configure a user-specifically customizable transformed sensor based on amending a sensor value and/or actuator status of a sensor and/or actuator of a sensor and actuator network, and machine task, based on logically linking sensor values, transformed sensor values and actuator statuses, wherein the user-specific customizability is enabled by providing a selectability, linkability and conditionability of sensor values, transformed sensor values and actuator statuses as variables, wherein at least two variables are logically linked and wherein at least one variable is conditioned based on using relational operators.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
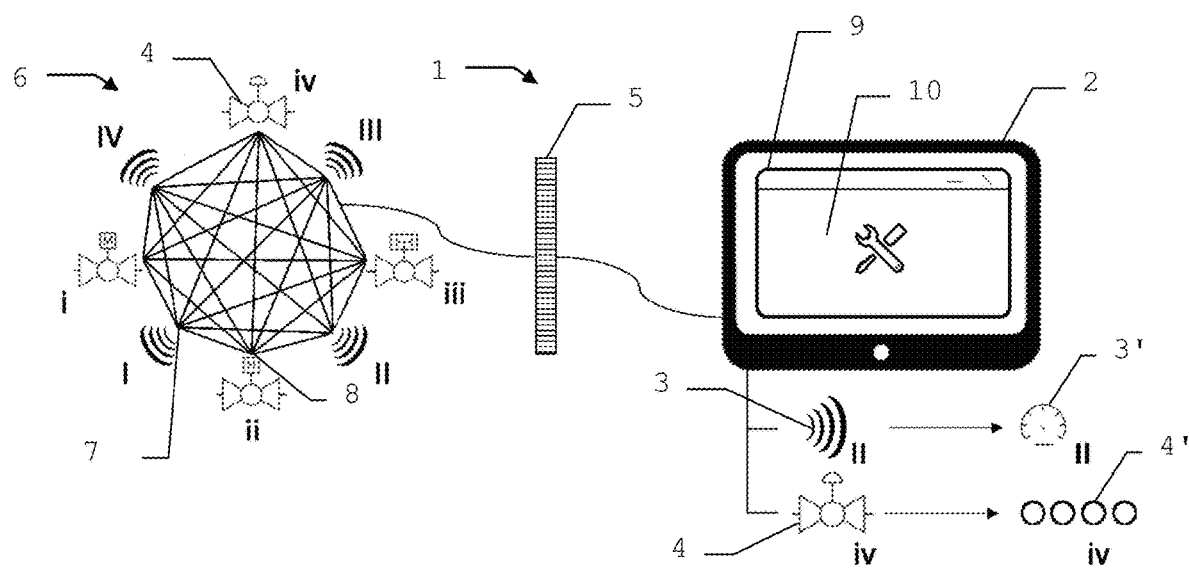
FIG. 1 shows a schematic illustration of a control system comprising general features being common to most embodiments of the invention.

For a better understanding of the following embodiments FIG. 1 shows a schematic illustration of a control system comprising general features being common to most embodiments of the invention. The invention is not limited to the embodiment illustrated in FIG. 1 as it only serves the purpose of providing an overview over the different features and the relation between them. Therefore, in specific embodiments features illustrated in FIG. 1 may be removed, replaced, amended or supplemented. Also relationships between the features can be different in specific embodiments.

Such a control system (1) for automatically monitoring machine tasks and workflows performed by agriculture, mining or construction machines, is shown in FIG. 1, comprising a computer (2) for enabling a user to configure sensors and actuators and for reading sensor (3) and actuator signals (4) as sensor values (3') and actuator statuses (4'), a hardware interface (5) for connecting the computer to an installed sensor and actuator network (6) having a plurality of sensors (7) and actuators (8), and a software configuration tool (9) with a software interface (10), wherein the software interface enables a user to enter configuration instructions for instructing the computer, to configure a user-specifically customizable transformed sensor and machine task.

Figure 2:
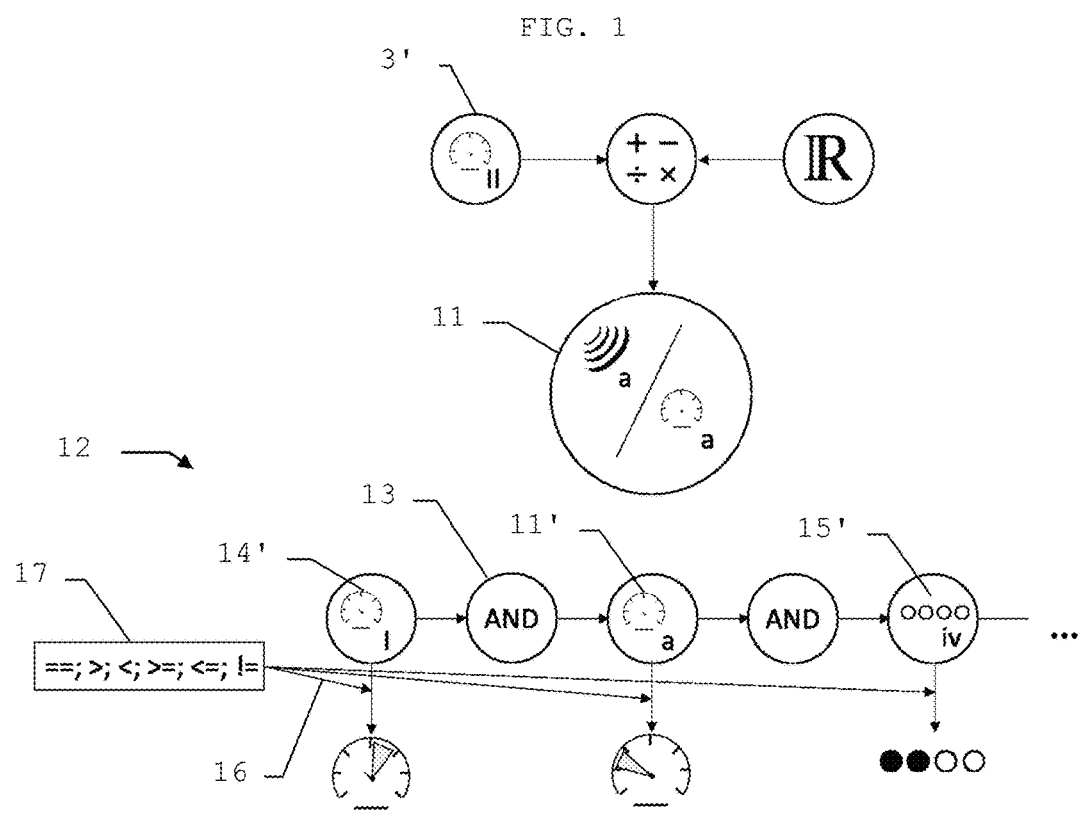
FIG. 2 shows a schematic illustration of how a transformed sensor and machine task can be customizably configured with features common to most embodiments of the invention.

FIG. 2 shows a schematic illustration of how a transformed sensor and a machine task can be customizably configured. In analogy to FIG. 1, FIG. 2 serves to create a better understanding based on what features machine tasks and workflows can be configured. The features of FIG. 2 are common to most embodiments of the invention, still the invention is not limited to them. Therefore, in specific embodiments features illustrated in FIG. 2 may be removed, replaced, amended or supplemented. Also relationships between the features can be different in specific embodiments.

A transformed sensor (11) can be customizably configured based on amending a sensor value and/or actuator status of a sensor and/or actuator of the sensor and actuator network. A machine task (12) can be customizably configured based on logically linking (13) sensor values (14'), transformed sensor values (11') and actuator statuses (15'). Thereby, the user-specific customizability is enabled by providing a selectability, linkability and conditionability of sensor values, transformed sensor values and actuator statuses as variables, wherein at least two variables are logically linked and wherein at least one variable is conditioned (16) based on using relational operators (17).

The automatic machine task monitoring functionality of the control system serves the purpose of registering/storing in the form of analyzable data the machine status comprising machine tasks and workflows being executed by the machine along its lifetime in order to provide information related to its efficiency. A machine can be a tractor, a harvester, a road truck, a train, a haul truck, an excavator, or any other self-propelled vehicle which performs tasks in agriculture, mining or construction.

More specifically, it may register/store time-related machine status information, e.g. in case the machine is a harvester, sorted by machine tasks like (T1) cutting the crop; (T2) maneuvering; (T3) waiting for refuel; (T4) move from a farm site to another; (T5) stop for lunch; (T6) stop for regular maintenance; (T7) stop for repairing; etc. With this information, managers are able to check the machine performance and take actions to optimize their returns.

These different states or machine tasks are well defined from the machine behavior perspective. In case of a harvester it can be said that if the harvester is in the status (T1) or performing machine task (T1), it must be (T1C1) moving, (T1C2) engine speed is HI, (T1C3) base cutter is ON, (T1C4) base cutter position is LOW and (T1C5) elevator is ON. Then, passing to status (T2) or machine task (T2), it must still be (T2C1) moving, (T2C2) engine speed is LOW, (T2C3) base cutter is OFF, (T2C4) base cutter position is HI, (T2C5) elevator is OFF. So, if the machine has enough sensors and actuators installed on it, this information may be read by the computer and the control system can automatically identify in which status the machine is or which machine task it performs based on the combination of related sensor values, transformed sensor values and actuator statuses. Within the task definitions T1 to T6 related variables are conditioned (T1C1, T1C2 . . . ) and linked together using the AND operator.

It may also be possible to use the sensor and actuator signals (3, 4) being the raw data of the sensors and actuators instead of the sensor values and actuator statuses in configuring transformed sensors or machine tasks. But usually the raw data needs some treatment, e.g. filtering as raw data from sensors can be difficult to be read, depending on how it is formatted. The engine speed in a CAN-bus message could be a 10 bit number, representing 0 to 5000 rpm, so each bit represents 4.88 rpm. If a user wants to configure a transformed sensor or machine task based on such a sensor signal, it is useful if the signal is standardized, or in a well-known format. Further, noisy sensor of actuator data can be useless in the configuration of a machine task, because some thresholds can be overrun.

Configuring a transformed sensor can involve the sensor or actuator signal, a sensor value or actuator status as an operand in a mathematical operation. Examples for a mathematical operation over a sensor signal or sensor value respectively are $$EngineSpeed=Multiplication[RAW\_DATA; 4.88], or$$

$$SmoothEngineSpeed=MovingAverage[EngineSpeed, 4],$$

wherein the raw data, 4.88, EngineSpeed and 4 are corresponding operands. E.g. 4 represents the number of samples of which the average is calculated. So, if RAW_DATA=380 then EngineSpeed=380*4.88=1854 and if, in a set of least n EngineSpeed samples {1854, 1879, 1903, 1806, 1900, 1700, 1837, . . . },
the SmoothEngineSpeed is calculated as $$(1854+1879+1903+1806)/4, so: SmoothEngineSpeed=1861.$$

A further example is:

$$TravelledDistance=Integrator(GNSS\_SPEED)$$

So, in a set of n GNSS_SPEED readings, TravelledDistance keeps the sum of all readings. And if covered area is needed, then TravelledDistance is multiplied by the machine width:

$$Area=Multiplication(TravelledDistance, MACHINE\_WIDTH).$$

Figure 3:
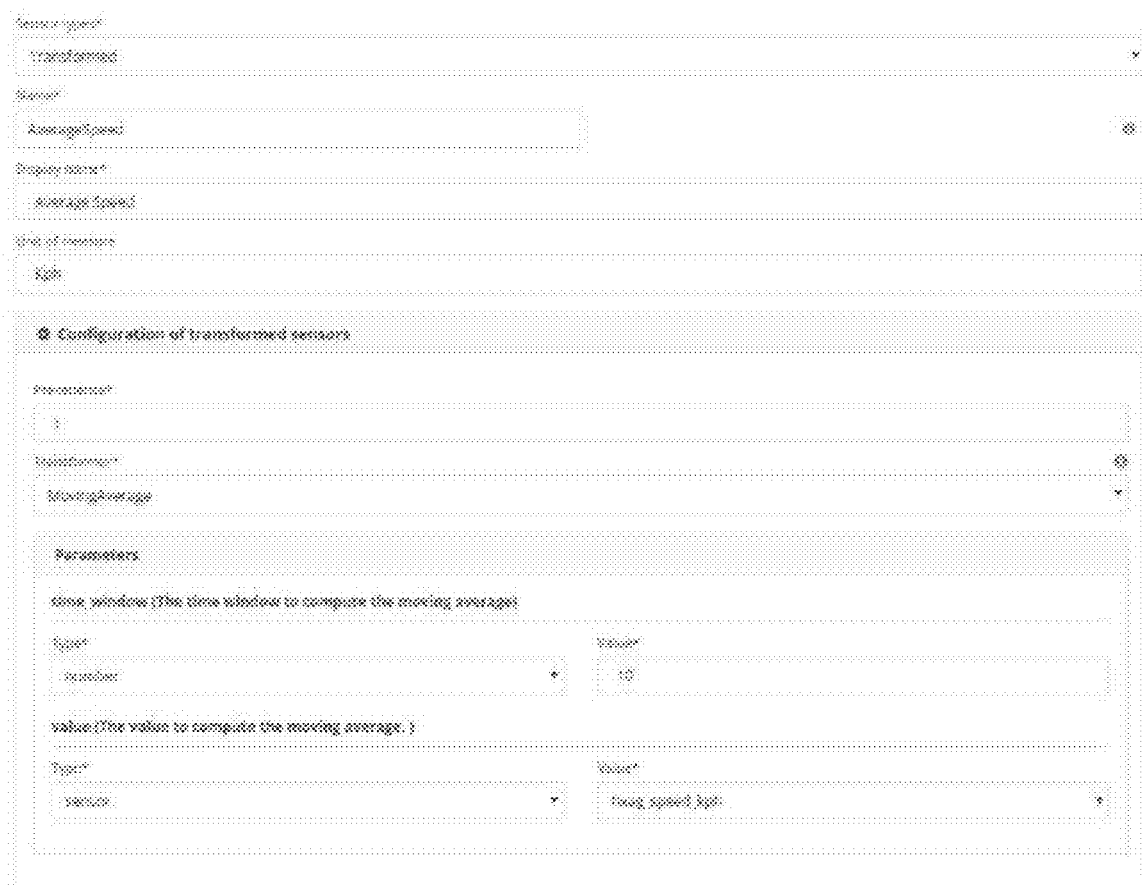
FIG. 3 shows an illustration of a possible embodiment of the software interface being used for configuring a transformed sensor.

FIG. 3 shows a possible embodiment of the software interface which could be used for configuring a transformed sensor wherein the mathematical operation to be performed on the sensor value is the MovingAverage operation meaning addition of 10 subsequent sensor values and division of the sum by 10.

As an example machine task T1 is configured based on a set of a sensor value, a transformed sensor value and an actuator status, being logically linked. The software configuration tool allows a user to configure the set of a sensor value, a transformed sensor value and an actuator status that describes the performed machine task T1. The sensor values and the actuator status can be arranged using relational operators ($==, >, <, >=, <=, !=$) for conditioning the values and the status and logical operators (AND, OR) for linking the conditioned values and status. Therefore, T1 is configured based on following conditions which have to be true:

Base cutter is ON (BaseCutter==1).
Engine speed is greater than 1500 rpm (EngineSpeed>1500).
Vehicle speed is between 2 kph and 8 kph (AverageSpeed>=2 AND AverageSpeed<=8).

Consequently, the configuration instruction for the machine task T1 is:
(BaseCutter==1) AND (EngineSpeed>1500) AND [(Speed>=2) AND (Speed<=8)].

Figure 4:
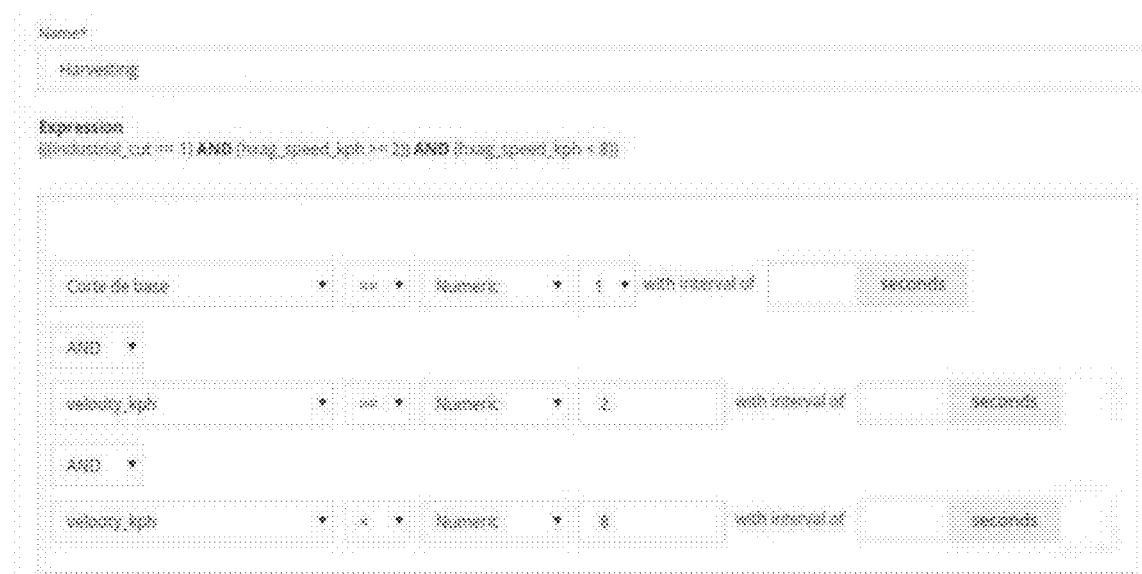
FIG. 4 shows an illustration of a possible embodiment of the software interface being used for configuring a machine task.

A possible embodiment of the software interface which could be used for configuring the machine task T1 is shown in FIG. 4.

Figure 5:
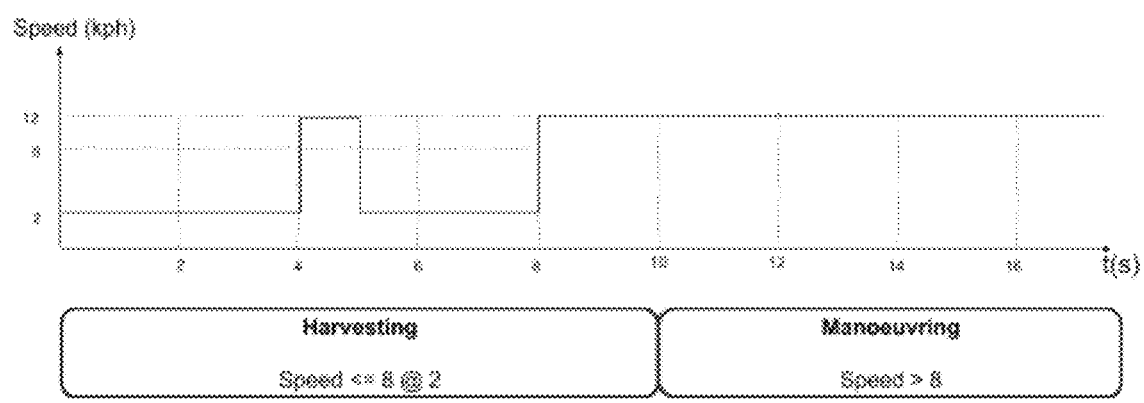
FIG. 5 illustrates how a time tolerance value can be implemented into a machine task configuration in order to keep automatic identification of machine tasks reliable.

The control system with its software configuration tool also allows the configuration of a time tolerance for machine tasks. This time tolerance or threshold represents the tolerance that a given condition can be invalid before taking effect in machine task invalidation. The motivation behind this feature is to avoid task change due to a sensor/transformed sensor signal or value noise or when the signal or value lays near the edge. In FIG. 5, the "Harvesting" machine task T1 is configured including a 2 seconds tolerance in the maximum speed expression, so, if the speed is over 8 kph for less than 2 seconds, the system won't invalidate the task. In the example of FIG. 5 the speed is over 8 kph from second 4 to 5, and the harvesting task is kept as the current task. On second 8, the speed went over 8 kph and is kept above 8 kph, so after the 2 seconds tolerance, on second 10, the control system switches and invalidates the "Harvesting" task as the current task and searches for the new task, in this case, maneuvering.

Further, it might be possible to configure a user-specifically customizable workflow based on a chronological sequence of machine tasks. Transition between machine tasks of a workflow are automatically identified during monitoring of the machine tasks and do not rely on a user interaction. This feature allows the operator to focus on operating the machine, without needing to manually input to the control system related instructions each time an activity change occurs. Overall operation quality is improved. Another advantage is that automatic machine task transition is instantaneous, allowing the operation managers to analyze task durations to improve efficiency.

A possible exemplary workflow in case of a harvester could comprise the chronological sequence of:
Harvesting→Maneuvering→Displacement to another farm site→Harvesting.

Each machine task is configure based on logically linked conditioned sensor values, transformed sensor values and actuator statuses. Therefore, the control system can check whether the according conditions are true or not. When the "Harvesting" condition is valid, the control system detects it and registers/stores the according time related data to the data storage in the form of analyzable data. After some time, the operator turns off the Base Cutter. The control system automatically detects it and will transit inside the workflow to a valid task, maneuvering, for example. This process continues during all the operation of the machine.

The software configuration tool is designed such that a user can configure a customized workflow which better fits his process associated with the according machine.

Within such configured workflows, a machine task has at least a preceding and at least a subsequent machine task. This might be particularly useful in cases where two different machine tasks are equally configured because the machine behavior is the same for both tasks. An example is when the operator stops the machine to have lunch or because of bad climate conditions. Besides the sensors and actuators provide exactly the same values and statuses, the purpose of the task is completely different. In the first case, an operator replacement could put the machine back to work, while in the second case there's absolutely nothing to be done to make the machine work. In such cases a preceding and a subsequent machine task can assist the automatic identification of the correct machine task which is important to generate correct data for analyzing the machine's efficiency.

Besides initiating the automatic identification and registration of machine tasks and workflows the identification of a machine task can be further used within the software configuration tool to initiate a software routine based action. Thereby an action can be initiated based on logically linking conditioned sensor/transformed sensor values and actuator statuses or based on whether a machine task is entered or exited. Possible actions can be e.g. logging out, checking for updates, updating, looking for paired vehicles. The software configuration tool allows thereby to user-specifically customize an action, such that it is triggered on situations demanded by the user.

Agriculture, mining and construction machines being manufactured usually have lots of sensors and actuators, including sensors for sensing e.g. engine speed, gear position, fuel consumption, torque, etc. These sensors and actuators are usually connected to a manufacturer Electronic Control Unit (ECU), which provides that information through a standard CAN-bus. Therefore, the control system might be equipped with a hardware interface having a CAN port which can be connected to the corresponding machine and read information being distributed via this bus. This is possible as in most cases the machine manufacturer uses well defined standards for CAN Physical and Data Link layers (OSI model). Generally, the Frame Identifier Fields are used to identify the message while the Data Field carries the sensors data. Then, after the control system recognizes a message, it must know how to extract data from the Data Field, which could contain many sensor or actuator signal or signal related data information split in different sizes (bits) and data representations (endianness).

As an example: The engine speed of a specific harvester is a 10 bit little endian number starting from the bit 4 (of 64 total). The software configuration tool allows, by means of the software interface, a user to configure this sensor or actuator by giving it a name typing the message identifier and specifying how the raw data is extracted. Then, the user remotely and wirelessly deploys this configuration via the Internet to the control system or a plurality thereof, which will be able to use this sensor or actuator information for configuring transformed sensors, machine tasks, workflows, software routine based actions and thereby for automatic machine task identification. It is also possible to read sensors or actuators through On-board diagnostics (OBD), which is another standard implemented over CAN-bus. In this case, the user should specify how to read the information from the bus, and also how to request this information by means of the software configuration tool.

If the machine doesn't provide a needed sensor or actuator information via CAN bus, extra sensors or actuators can be installed (e.g. hydraulic outlet lever position: HI/LO, fuel level: 0-5 Volts, engine speed: frequency based). Such sensors or actuators can be connected to the hardware interface of the control system or to the manufacturer's ECU. The software configuration tool allows a user to configure this sensor or actuator by giving it a name and mapping the pin of the hardware interface of the control system or the ECU input ports to work as digital, analog or frequency based.

The computer of the control system may have a built-in global navigation satellite system (GNSS) receiver and may connect to external receivers. A GNSS provides much information about the vehicle attitude, such as e.g. position (longitude, latitude and height in earth), speed, heading, date and time. This information can also be used as sensors. Geospatial information can define if the machine is inside/outside a polygon (e.g. farm, mill, forbidden area}, or near to a wayline (road) or a point of interest (bam water outlet).

The computer of the control system or the ECUs may have internal devices like Wi-Fi, cell modem, temperature sensors that can also be configured as sensors or actuators and have their own sensor values or actuator statuses (e.g. Wi-Fi is connected or not).

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention. In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A control system for automatically monitoring machine tasks and workflows performed by agriculture, mining or construction machines, comprising:
   a computer for enabling a user to configure sensors and actuators and for reading sensor and actuator signals as sensor values and actuator statuses,
   a hardware interface for connecting the computer to an installed sensor and actuator network having a plurality of sensors and actuators, and
   a software configuration tool with a software interface, wherein the software interface is configured to receive configuration instructions from a user, the configuration instructions configuring:
      a user-specifically customizable transformed sensor based on amending a sensor value and/or actuator status of a sensor and/or actuator of the sensor and actuator network, and
      a user-specifically customizable machine task, based on logically linking sensor values, transformed sensor values and actuator statuses,
      wherein user-specific customizability is enabled by providing a selectability, linkability and conditionability of sensor values, transformed sensor values and actuator statuses as variables, wherein at least two variables are logically linked and wherein at least one variable is conditioned based on using relational operators;
      wherein the software configuration tool is further configured to instruct the computer based on the received configuration instructions.

2. The control system according to claim 1, wherein a sensor value and/or actuator status of a sensor and/or actuator of the sensor and actuator network is amended based on a mathematical operation involving corresponding operators and operands.

3. The control system according to claim 1, logically linking at least two variables being based on using at least one of the Boolean operators.

4. The control system according to claim 1, wherein the software interface enables a user to enter configuration instructions for instructing the computer, to configure a user-specifically customizable workflow based on a chronological sequence of machine tasks.

5. The control system according to claim 1, wherein the software interface is implemented as web-interface.

6. The control system according to claim 1, wherein a plurality of sensors and actuators of the installed sensor and actuator network provide related signals based on the controller area network bus (CAN-bus) standard.

7. The control system according to claim 1, wherein the computer has a display functionality realized as touchscreen enabling a user to enter configuration instructions by means of the software interface.

8. The control system according to claim 1, further comprising a data storage, wherein, the computer is configured for sending data to and retrieving data from the data storage.

9. The control system according to claim 8, wherein the computer is configured for:
   automatically identifying a configured machine task and/or workflow during operation of a machine being equipped with such a control system based on read sensor values, transformed sensor values and actuator statuses, and
   for sending time related machine task and/or workflow data to the data storage for data collection.

10. The control system according to claim 8, the computer having a machine learning module with a machine learning functionality, wherein:
    based on the collected data stored in the data storage the machine learning module within the machine learning functionality automatically identifies machine tasks and workflows depending on read sensor signals, transformed sensor signals and actuator statuses, and
    the computer is configured for sending time related data of as-identified machine tasks and workflows to the data storage.

11. The control system according to claim 8, the computer being configured for assigning a machine operator identification (OID) to the data being sent to the data storage.

12. The control system according to claim 1, the computer having a geospatial sensor being includable into the sensor and actuator network and providing information on a machine's position on earth, speed, heading and on date and time.

13. The control system according to claim 1, wherein the software interface enables a user to distribute corresponding configuration instructions to a plurality of computers being part of a plurality of control systems.

14. The control system according to claim 1, wherein the software interface enables a user to enter configuration instructions for instructing the computer, to configure a user-specifically customizable action being executed by the computer and being triggered based on at least one of:
    a read sensor value,
    a read transformed sensor value, and
    a read actuator status.

15. The control system according to claim 1, wherein the software configuration tool is remotely integrated in the control system.

16. A computer program product comprising:
    computer code on a non-transitory machine readable medium, which when executed causes the computer to provide the software configuration tool within the control system according to claim 1, which software configuration tool has the software interface, wherein:
       the software interface enables the user to enter the configuration instructions for instructing the computer, to configure the user-specifically customizable transformed sensor based on amending the sensor value and/or actuator status of the sensor and/or actuator of the sensor and actuator network, and machine task, based on logically linking sensor values, transformed sensor values and actuator statuses,
       wherein the user-specific customizability is enabled by providing the selectability, linkability and conditionability of sensor values, transformed sensor values and actuator statuses as variables, wherein the at least two variables are logically linked, and
    the at least one variable is conditioned based on using the relational operators.

* * * * *